(12) United States Patent
Son

(10) Patent No.: US 7,615,959 B2
(45) Date of Patent: Nov. 10, 2009

(54) APPARATUS AND METHOD FOR CONTROLLING BRUSHLESS DC MOTOR

(75) Inventor: Yeon-Ho Son, Suwon-si (KR)

(73) Assignee: Samsung Electro-Mechanics Co., Ltd., Suwon-Si (KR)

( * ) Notice: Subject to any disclaimer, the term of this patent is extended or adjusted under 35 U.S.C. 154(b) by 0 days.

(21) Appl. No.: 11/541,581

(22) Filed: Oct. 3, 2006

(65) Prior Publication Data

US 2007/0085500 A1   Apr. 19, 2007

(30) Foreign Application Priority Data

Oct. 13, 2005   (KR) ............... 10-2005-0096459

(51) Int. Cl.
*G05G 5/04* (2006.01)

(52) U.S. Cl. ............... 318/603; 318/400.34; 318/626

(58) Field of Classification Search ............... 318/138, 318/254, 439, 720–724, 264–267, 286, 466–470, 318/450, 463, 475, 600–605, 626, 700, 400.01, 318/400.06, 400.34

See application file for complete search history.

(56) References Cited

U.S. PATENT DOCUMENTS

| | | | | |
|---|---|---|---|---|
| 3,568,028 A | * | 3/1971 | Veillette | 318/571 |
| 3,924,721 A | * | 12/1975 | Reynolds | 400/162.2 |
| 4,350,941 A | * | 9/1982 | McClure et al. | 318/603 |
| 4,565,956 A | * | 1/1986 | Zimmermann et al. | 318/721 |
| 4,608,527 A | * | 8/1986 | Glennon et al. | 318/685 |
| 4,673,848 A | * | 6/1987 | Hagiwara et al. | 318/266 |

(Continued)

FOREIGN PATENT DOCUMENTS

CN   1449984   10/2003

(Continued)

OTHER PUBLICATIONS

Office Action issued in corresponding German Patent Application No. 10 2006 047 214.4-32, on Nov. 19, 2007.

(Continued)

*Primary Examiner*—Bentsu Ro
(74) *Attorney, Agent, or Firm*—Staas & Halsey LLP

(57) ABSTRACT

Disclosed is a control apparatus for a brushless DC motor, which has a rotor with n poles (where n is a natural number) that rotates due to a supply current with m phases (where m is a natural number) applied to a stator, controlling the number of output rotations of a gearbox, which is connected to the brushless DC motor and has a predetermined gear reduction ratio-wherein the gear reduction ratio represents a ratio of the number of rotations of the brushless DC motor to the number of output rotations of the gearbox-, the control apparatus comprising: a rotation detector part, which counts the number of rotation pulses generated by the rotation of the rotor from the brushless DC motor; a required rotational amount input part, which receives the number of output rotations as input and converts it to a corresponding required number of rotation pulses; a comparison part, which compares the number of output rotations and the required number of rotation pulses; and a current controller part, which controls a supply current applied to the brushless DC motor according to a comparison result of the comparison part.

6 Claims, 6 Drawing Sheets

U.S. PATENT DOCUMENTS

| | | | |
|---|---|---|---|
| 4,845,416 A * | 7/1989 | Scholl et al. | 318/600 |
| 4,922,169 A | 5/1990 | Freeman | |
| 5,635,810 A * | 6/1997 | Goel | 318/719 |
| 5,847,530 A * | 12/1998 | Hill | 318/599 |
| 6,002,234 A * | 12/1999 | Ohm et al. | 318/729 |
| 7,202,622 B2 * | 4/2007 | Eskritt et al. | 318/437 |
| 2007/0246324 A1 * | 10/2007 | Lais | 193/31 A |

FOREIGN PATENT DOCUMENTS

| | | |
|---|---|---|
| EP | 0 921 630 | 10/2005 |
| JP | 4-197854 | 7/1992 |
| JP | 11-113289 | 4/1999 |
| JP | 2002-44985 | 2/2002 |
| KR | 1998-013970 | 5/1998 |

OTHER PUBLICATIONS

English translation of Chinese Patent Office Action, mailed Jan. 4, 2008 and issued in corresponding Chinese Patent Application No. 200610140040.1.

Japanese Office Action mailed on Jun. 1, 2009 and issued in corresponding Japanese Patent Application 2006-278289.

* cited by examiner

APPARATUS AND METHOD FOR CONTROLLING BRUSHLESS DC MOTOR

CROSS-REFERENCE TO RELATED APPLICATIONS

This application claims the benefit of Korean Patent Application No. 10-2005-0096459 filed with the Korean Intellectual Property Office on Oct. 13, 2005, the disclosures of which are incorporated herein by reference in their entirety.

BACKGROUND

1. Technical Field

The present invention relates to a DC motor, and in particular, to a control apparatus controlling the number of rotations of a brushless DC motor and a control method thereof.

2. Description of the Related Art

The motor is a kind of energy conversion device, which converts electric energy to rotational or linear kinetic energy by means of electromagnetic phenomena. With the expansion of its fields of application due to the widespread use of electronic equipment in the electric, electronic, and mechanical industries, the importance of the motor is increasing as a critical driving source. In addition, with a rapid growth of the industries have been introduced the driving motors with faster speeds and larger capacities.

In particular, a precision control motor provides accurate movement with a fast response time and a wide range of speed controls. This motor operates according to control signals by repeating stop, start, and reverse actions, etc. The precision control motors are continually increasing in importance with the advance of technology and expansion of application fields such as advances in power electronics, advances in microcomputers, practical application of precision technology and high performance permanent magnets, and advances in surface mounting technology.

Examples of such precision control motors include stepping motors and brushless DC motors, which usually use highly efficient permanent magnets. The stepping motor is most often used for position controlling. In accurately controlling mechanical displacements, the stepping motors are suitable for micoms because they allow a digitalized control by using pulses. The stepping motor can perform a rotation of a specified angle and can stop with a high level of precision without a feedback for detecting the position of the motor shaft. Also, the stepping motor allows an open loop control, is easily controlled through digital signals, and has a maintenance torque when stopping.

However, the torque is low in the stepping motors, so that it is difficult to apply in fields requiring a high torque. Also, the stepping motor is likely to vibrate and resonate at certain frequencies, is weak against loads with inertia, and is likely to be stepped out during high-speed operations. Further, since a sufficient current cannot flow through winding wires due to an inductance effect of the winding wires during operation with a common driver, the torque is reduced with increasing pulse rate to yield a lower efficiency as compared to a DC motor.

Thus, a brushless DC motor, which provides a high torque, is preferred in controlling the position or the number of rotations. Not only is the brushless DC motor durable and efficient, it allows for easy use in a constant speed control and a variable speed control.

The brushless DC motor is devised without a brush, which acts as a commutator, while maintaining the properties of a DC motor, and can be classified as a sensor type or a sensorless type according to whether or not it has a sensor which detects both the position of the rotor and the rotary speed.

In Korean patent publication no. 1998-0013970, "sensorless BLDC motor position control method" is disclosed. It relates to a BLDC motor, wherein the counter electromotive forces generated in the stator are detected by the rotor of the motor, and pulses are divided into a multiple number, as these counter electromotive forces are compared with a reference voltage. The pulses are counted to determine the accurate position of the rotor of the motor with regard to the normal position of the rotor of the motor, and corresponding control signals are outputted to provide accurate position control.

This positioning control based on the control signals aims to control a rotational position of the rotor of the motor, but cannot control a rotational angle of the rotor.

SUMMARY

Accordingly, the present invention aims to provide a brushless DC motor control apparatus and control method thereof, which can control a rotational angle of the brushless DC motor accurately by employing a gearbox.

Also, the present invention aims to provide a brushless DC motor control apparatus and control method thereof, which can control the number of rotations of the brushless DC motor in a digitalized way by detecting and counting counter electromotive force from a sensorless type brushless DC motor.

Also, the present invention aims to provide a brushless control apparatus and control method thereof, which can control the number of rotations of the brushless DC motor in a digitalized way by detecting and counting F/G pulses from a sensor type brushless DC motor.

Also, the present invention aims to provide a brushless DC motor control apparatus and control method thereof, which can control a rotational position of the brushless DC motor since it can control less than 360° such as one half rotation, one third rotation, and a rotation by 1°, etc.

One aspect of the present invention provides a control apparatus for a brushless DC motor, which has a rotor with n poles (where n is a natural number) that rotates due to a supply current with m phases (where m is a natural number) applied to a stator, controlling the number of output rotations of a gearbox, which is connected to the brushless DC motor and has a predetermined gear reduction ratio-wherein the gear reduction ratio represents a ratio of the number of rotations of the brushless DC motor to the number of output rotations of the gearbox-, the control apparatus comprising: a rotation detector part, which counts the number of rotation pulses generated by the rotation of the rotor from the brushless DC motor; a required rotational amount input part, which receives the number of output rotations as input and converts it to a corresponding required number of rotation pulses; a comparison part, which compares the number of output rotations and the required number of rotation pulses; and a current controller part, which controls a supply current applied to the brushless DC motor according to a comparison result of the comparison part.

Here, the current controller part controls the supply current so as to rotate the brushless DC motor when the number of rotation pulses is smaller than the required number of rotation pulses.

Also, the current controller part controls the supply current so as to stop the brushless DC motor when the number of rotation pulses is equal to the required number of rotation pulses.

Also, the brushless DC motor is a sensorless type, and the rotation detector part counts the total number of detections of counter electromotive force generated in a multiphase coil of the stator as the number of rotation pulses.

Here, the required number of rotation pulses is equal to (the number of output rotations)×(the gear reduction ratio)×(the total number of occurrences of counter electromotive force per one rotation of the brushless DC motor).

Also, the brushless DC motor is a sensor type, and the rotation detector part comprises a magnetic sensor, which senses F/G pulses generated by the rotation of the rotor, and counts the total number of detections of the F/G pulses as the number of rotation pulses.

Here, the required number of rotation pulses is equal to (the number of output rotations)×(the gear reduction ratio)×(the total number of F/G pulses generated during one rotation of the brushless DC motor).

Also, the current controller part applies the supply current to activate the brushless DC motor after the number of output rotations is inputted to the required rotational amount input part.

Also, the current controller part comprises a multiphase inverter for applying the supply current with m phases to the brushless DC motor.

Another aspect of the present invention provides a control method for a brushless DC motor, which has a rotor with n poles (where n is a natural number) that rotates due to a supply current with m phases (where m is a natural number) applied to a slot of a stator, controlling the number of output rotations of a gearbox, which is connected to the brushless DC motor and has a predetermined gear reduction ratio-wherein the gear reduction ratio represents a ratio of the number of rotations of the brushless DC motor to the number of output rotations of the gearbox-, the control method comprising: (a) receiving as input the number of output rotations; (b) converting the number of output rotations to a corresponding required number of rotation pulses; (c) applying a first supply current to activate the brushless DC motor; (d) counting the number of rotation pulses generated by the rotation of the brushless DC motor; (e) comparing the required number of rotation pulses and the number of rotation pulses; and (f) applying a second supply current to the brushless DC motor according to a comparison result of the step (e).

Here, the number of rotation pulses is smaller than the required number of rotation pulses, the step (f) applies the second supply current to rotate the brushless DC motor, and the steps (d) and (e) are repeated.

Also, the number of rotation pulses is equal to the required number of rotation pulses, the step (f) applies the second supply current to stop the brushless DC motor.

Also, the brushless DC motor is a sensorless type, and the step (d) counts the total number of detections of counter electromotive force generated in a multiphase coil of the stator as the number of rotation pulses.

Here, the required number of rotation pulses is equal to (the number of output rotations)×(the gear reduction ratio)×(the total number of occurrences of counter electromotive force per one rotation of the brushless DC motor).

Also, the brushless DC motor is a sensor type, and the step (d) counts the total number of detections of the F/G pulses generated due to the rotation of the stator as the number of rotation pulses.

Here, the required number of rotation pulses is equal to (the number of output rotations)×(the gear reduction ratio)×(the total number of F/G pulses generated during one rotation of the brushless DC motor).

Another aspect of the present invention provides A brushless DC motor module comprising: a brushless DC motor having a rotor with n (where n is a natural number) poles which rotates due to an m (where m is a natural number) phase supply current applied to a stator; a gearbox connected to the brushless DC motor and having a predetermined gear reduction ratio-wherein the gear reduction ratio represents a ratio of the number of rotations of the brushless DC motor to the number of output rotations of the gearbox-; and a brushless DC motor control apparatus controlling the number of output rotations by counting the number of rotation pulses generated due to the rotation of the rotor.

Here, the brushless DC motor control apparatus comprises: a rotation detector part counting the number of rotation pulses from the brushless DC motor; a required rotational amount input part receiving as input the number of output rotations and converting it to a corresponding required number of rotation pulses; a comparison part comparing the number of rotation pulses and the required number of rotation pulses; and a current controller part controlling the supply current applied to the brushless DC motor according to a comparison result of the comparison part.

Here, when the number of rotation pulses is smaller than the required number of rotation pulses, the current controller part controls the supply current to rotate the brushless DC motor.

Also, when the number of rotation pulses is equal to the required number of rotation pulses, the current controller part controls the supply current to stop the brushless DC motor.

Also, the brushless DC motor is a sensorless type, and the rotation detector part counts the total number of occurrences of counter electromotive force in a multiphase coil of the stator as the number of rotation pulses.

Here, the required number of rotation pulses is equal to (the number of output rotations)×(the gear reduction ratio)×(the total number of occurrences of counter electromotive force per one rotation of the brushless DC motor).

Also, the brushless DC motor is a sensor type, and the rotation detector part comprises a magnetic sensor sensing F/G pulses generated due to the rotation of the rotor, and counts the total number of detections of the F/G pulses as the number of rotation pulses.

Here, the required number of rotation pulses is equal to (the number of output rotations)×(the gear reduction ratio)×(the total number of F/G pulses generated during one rotation of the brushless DC motor).

Also, the current controller part applies the supply current to activate the brushless DC motor after the number of output rotations is inputted to the required rotational amount input part.

Also, the current controller part comprises a multiphase inverter for applying the supply current with m phases to the brushless DC motor.

Additional aspects and advantages of the present general inventive concept will be set forth in part in the description which follows, and in part will be obvious from the description, or may be learned by practice of the general inventive concept.

BRIEF DESCRIPTION OF THE DRAWINGS

These and other features, aspects, and advantages of the present invention will become better understood with regard to the following description, appended claims, and accompanying drawings where:

DETAILED DESCRIPTION

The descriptions set forth below merely illustrate the principles of the present invention. Therefore, those skilled in the art could devise various methods and apparatus thereof which realize the principles of the present invention and which do not depart from the spirit and scope of the present invention, even though they may not be clearly explained or illustrated in the present specification. Also, it is to be appreciated that not only the principles, viewpoints, and embodiments of the present invention, but all detailed descriptions listing the particular embodiments are intended to include structural and functional equivalents.

Other objectives, particular advantages, and novel features of the present invention will further be clarified by the detailed descriptions and preferred embodiments set forth below with reference to the accompanying drawings. In the describing the invention, detailed explanation of the prior art will be omitted when it is deemed to unnecessarily obscure the crux of the invention. Numerals used in the descriptions (for example, a first, a second, etc.) are merely used to distinguish equal or similar items in an ordinal manner.

Hereinafter, preferred embodiments of the invention will be described in detail with reference to the accompanying drawings.

Figure 1:
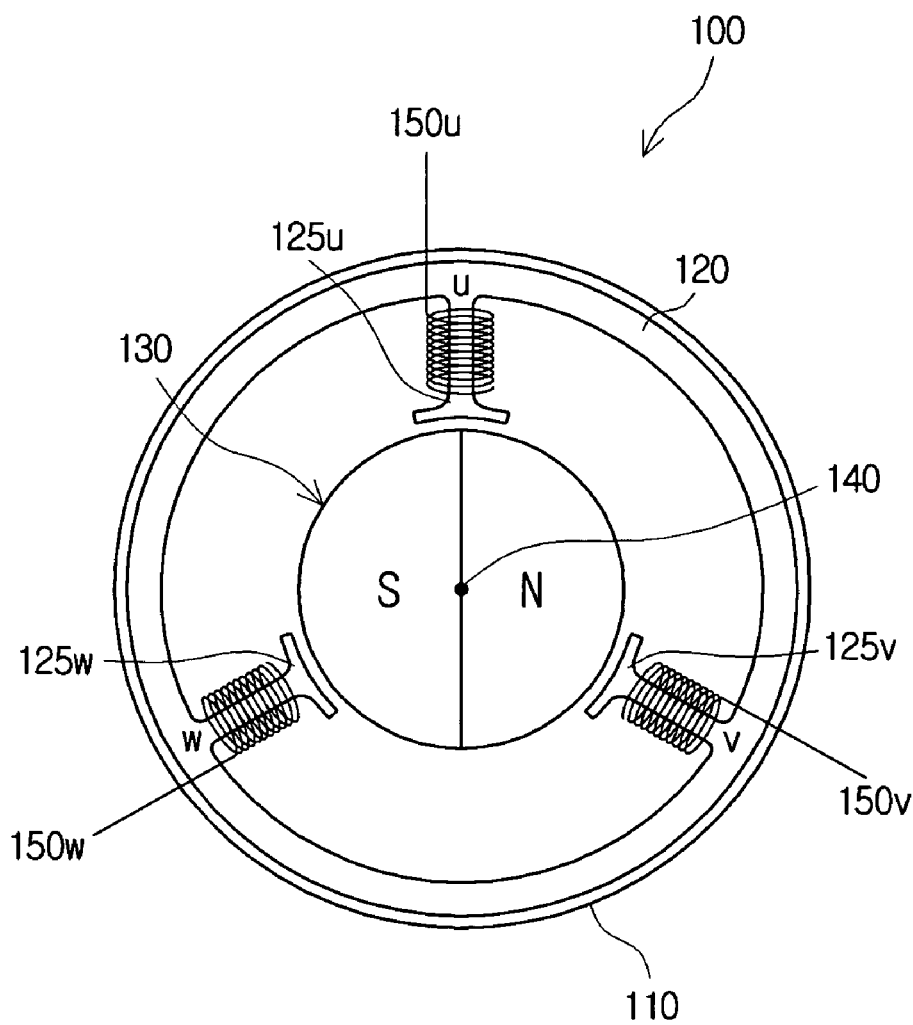
FIG. 1 shows a horizontal cross sectional view of a sensorless type brushless DC motor according to an embodiment of the present invention.

FIG. 1 is a horizontal cross sectional view of a sensorless type brushless DC motor according to an embodiment of the present invention. FIG. 1 illustrates a regular inner rotor type sensorless type brushless DC motor with three phases and two poles.

The sensorless type brushless DC motor 100 comprises a casing 110, a stator 120, a rotor 130, and a rotational axis 140.

The casing 110 is generally cylindrical, but of course, can be other shapes.

The stator 120 is located inside the casing 110, and comprises three-phase coils (a U-phase coil 150u, a V-phase coil 150v, a W-phase coil 150w) wound around a plurality of (three, in the present example) T-shaped teeth(125u, 125v, 125w, hereinafter referred to as 125). The plurality of teeth 125 are extended toward the rotational axis 140, and an equal number of slot openings are positioned in each tooth 125 through which the three-phase coils are wound.

The rotor 130 is located inside the casing 110, is rotatably inserted and secured in the center of the stator 120 in the center of the stator 120 and among the teeth 125 of the stator 120, and comprises a permanent magnet in which different poles (an N pole and an S pole, in the present example) are alternately positioned with respect to the rotational axis 140.

When a three-phase supply current is applied to the three-phase coils, i.e. the U-phase coil 150u, V-phase coil 150v, and W-phase coil 150w, the rotor 130 composed of the permanent magnet rotates about the rotational axis 140 due to a torque generated according to Fleming's Left Hand Rule.

The tooth 125u around which the U-phase coil 150u is wound faces the N pole and the S pole once each during one rotation of the rotor 130, so that a counter electromotive force is induced twice in the U-phase coil 150u. This is also true for the V-phase coil 150v and the W-phase coil 150w.

Therefore, during one rotation of the rotor 130, the counter electromotive force is induced six times in total in the U-phase coil 150u, V-phase coil 150v, and W-phase coil 150w. In other words, the number of rotations of the rotor 130 of the sensorless brushless DC motor 100 may be determined by adding the numbers of occurrences of the counter electromotive force in the U-phase coil 150u, V-phase coil 150v, and W-phase coil 150w, and then dividing by 6.

Since the stator 120 uses a three-phase induced current, the plurality of teeth 125 are formed in multiples of 3, and since the rotor 130 uses a permanent magnet with alternating N and S poles, the poles are formed in multiples of 2. Consequently, the ratio of the number of teeth 125 of the stator 120 to the number of poles of the rotor 130 is 3a:2b (where a and b are natural numbers). During one rotation of the rotor 130, the counter electromotive forces are generated 2b times in each tooth 125 of the stator 120, and the number of the teeth 125 of the stator 120 is a 3a, so that the total number of occurrences of counter electromotive forces in the sensorless type brushless DC motor 100 during one rotation of the rotor 130 is 6ab.

Figure 2:
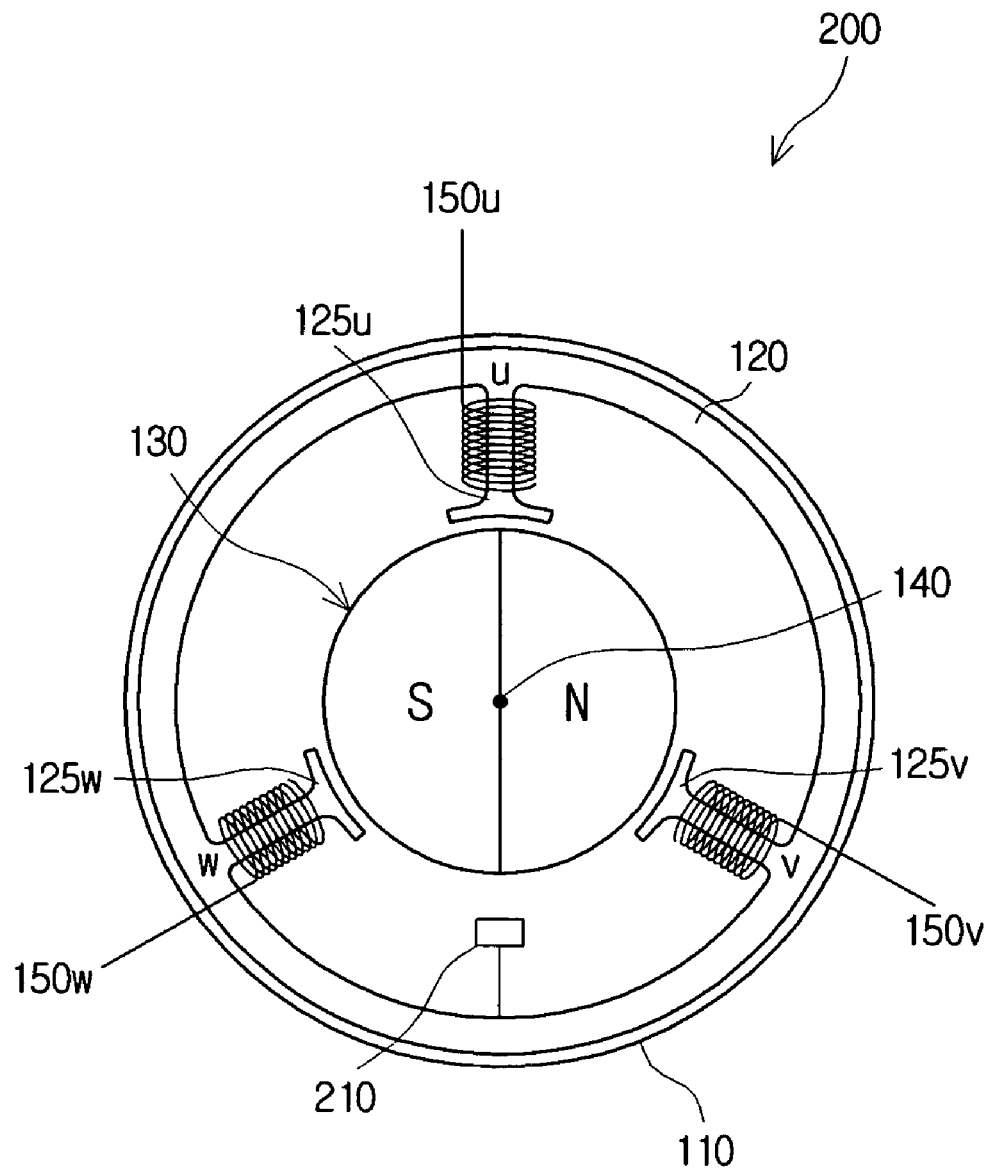
FIG. 2 shows a horizontal cross sectional view of a sensor type brushless DC motor according to another embodiment of the present invention.

FIG. 2 shows a horizontal cross sectional view of a sensor type brushless DC motor according to another embodiment of the present invention. FIG. 2 illustrates a regular inner rotor type sensor type brushless DC motor with three phases and two poles.

The sensor type brushless DC motor 200 comprises a casing 110, a stator 120, a rotor 130, a rotational axis 140, and a magnetic sensor 210.

The casing 110 is generally cylindrical, but of course, can be other shapes.

The stator 120 is located inside the casing 110, and comprises three-phase coils (a U-phase coil 150u, a V-phase coil 150v, a W-phase coil 150w) wound around a plurality of (three, in the present example) T-shaped teeth 125. The plurality of teeth 125 are extended toward the rotational axis, and an equal number of slot openings are positioned in each tooth 125 through which the three-phase coils are wound.

The rotor 130 is disposed inside the casing 110, is rotatably inserted and secured in the center of the stator 120 and among the teeth 125 of the stator 120, and comprises a permanent magnet in which different poles (an N pole and an S pole, in the present example) are alternately positioned with respect to the rotational axis 140.

When a three-phase supply current is applied to the three-phase coils, i.e. the U-phase coil 150u, V-phase coil 150v, and W-phase coil 150w, the rotor 130 composed of the permanent magnet rotates about the rotational axis 140 due to a torque generated according to Fleming's Left Hand Rule.

The magnetic sensor 210 located inside the casing 110 detects the position of the rotor 130. It may be disposed in a space between the two teeth 125, as shown in FIG. 2, or may be disposed on the tooth 125. From its location, the magnetic sensor 210 senses the proximity of the N and S poles according to a rotation of the rotor 130, and generates a F/G pulse (Frequency Generator pulse). In the present embodiment, the magnetic sensor 210 faces the N and S poles once each to generate one F/G pulse.

Accordingly, the detection of one F/G pulse indicates one rotation of the rotor 130 of the sensor type brushless DC motor 200.

As the stator 120 uses a three-phase induced current, the plurality of teeth 125 are formed in multiples of 3, and as the rotor 130 uses the permanent magnet with alternating N and S poles, the poles are formed in multiples of 2. In other words, the ratio of the number of teeth 125 of the stator 120 to the number of poles of the rotor 130 is 3a:2b (where a and b are natural numbers). Thus, the number of F/G pulses generated by the magnetic sensor 210 during one rotation of the rotor 130 is b. Here, the magnetic sensor 210 may be a hall element.

Figure 3:
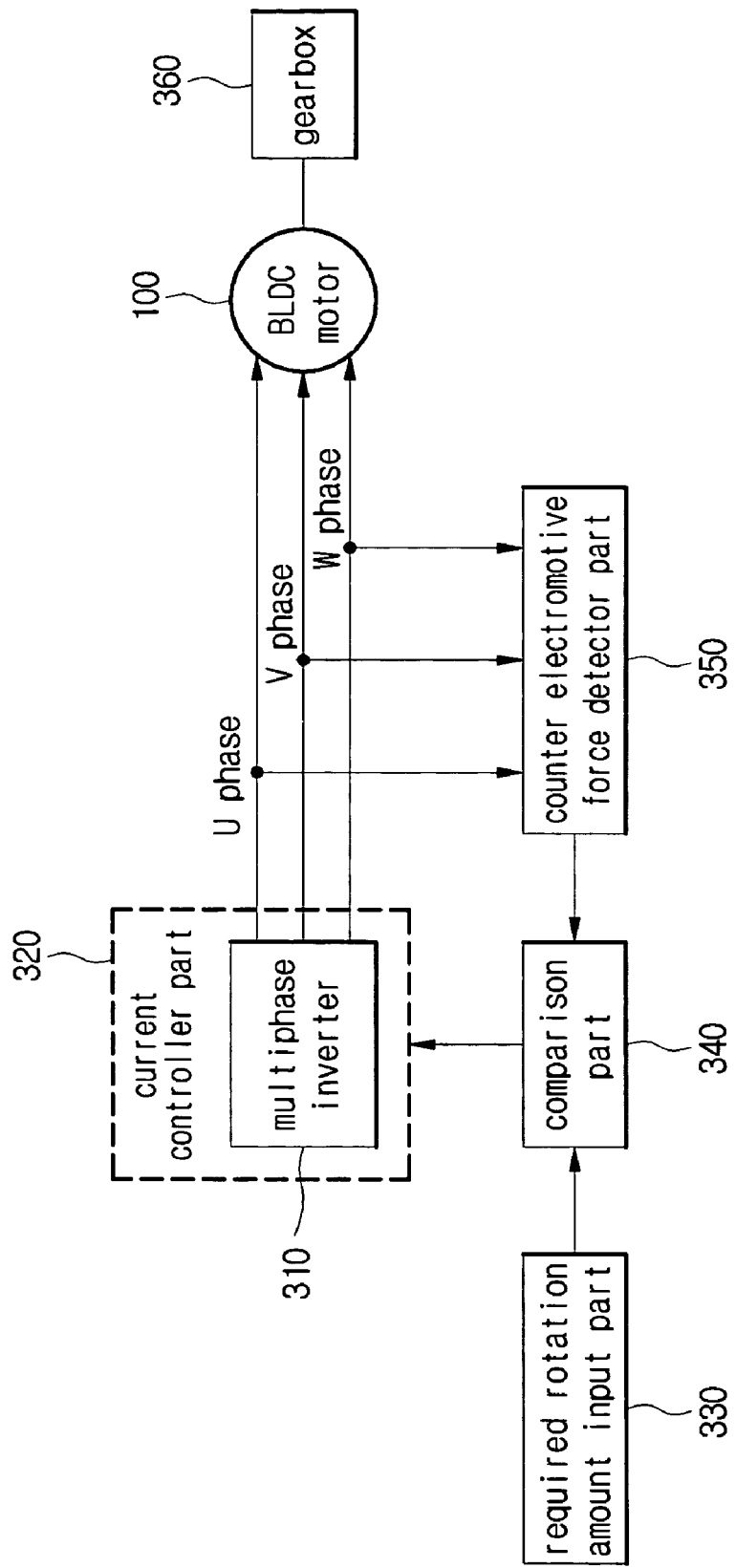
FIG. 3 is a schematic diagram illustrating a control apparatus for a sensorless type brushless DC motor according to an embodiment of the present invention.
Figure 4:
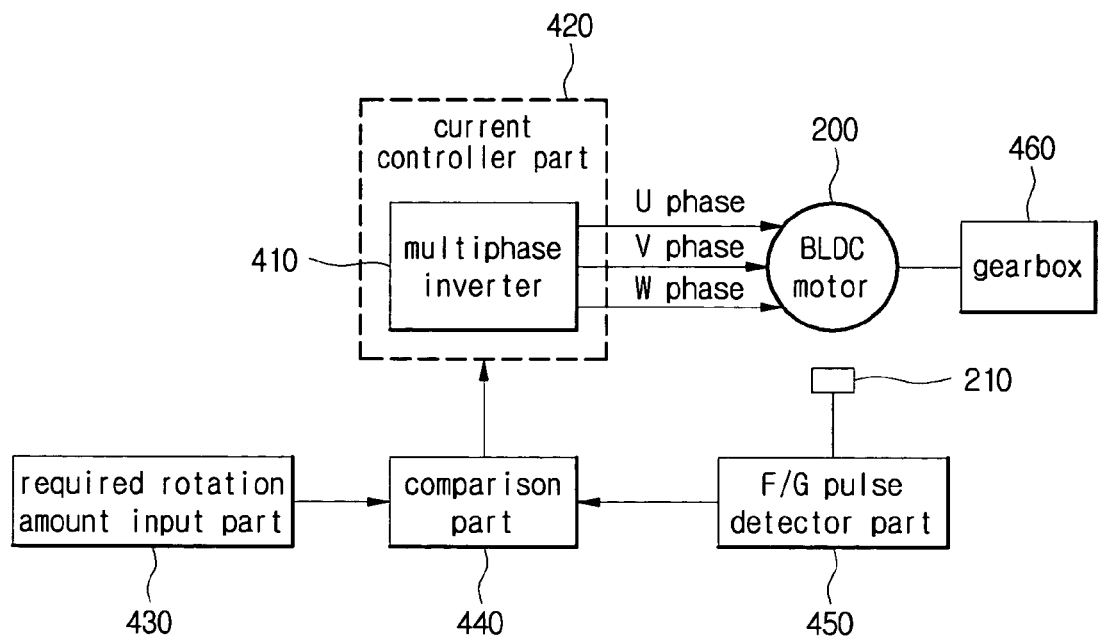
FIG. 4 is a schematic diagram illustrating a control apparatus for a sensor type brushless DC motor according to another embodiment of the present invention.

A brushless DC motor of the present invention comprises a gearbox 360, 460 (see FIGS. 3 and 4). The gearbox 360, 460 connected to the brushless DC motor 100, 200 reduces a rotational output of the brushless DC motor 100, 200, and transfers the reduced rotational output to an output part (not shown in the accompanying drawings). This gear box 360, 460 controls a rotary angle of its output rotation in proportion to the number of rotations of the brushless DC motor 100, 200 according to a predetermined gear reduction ratio.

In the case that the gear reduction ratio of the gearbox is k:1 (where k is a natural number), the brushless DC motor 100, 200 rotates once to generate a 1/k number of output rotation of the gearbox, whereby an accurate angle control can be performed. For example, when the k is 360, the brushless DC motor 100, 200 rotates to generate an output rotation by 1°, and when the k is 720, the sensor type brushless DC motor 100, 200 performs one rotation to generate an output rotation by 0.5°.

A brushless DC motor control apparatus comprising the gearbox 360, 460, described above, controls the number of rotations of the brushless DC motor. The brushless DC motor control apparatus comprises a rotation detector part, a required rotational amount input part, a comparison part, and a current controller part The rotation detector part counts the number of rotation pulses generated due to the rotations of the rotor from the brushless DC motor. In the case that the brushless DC motor is the sensorless type, the number of rotation pulses corresponds to the number of occurrences of counter electromotive forces induced in the multi-phase coils. However, in the case that the brushless DC motor is the sensor type, the number of rotation pulses corresponds to the number of F/G pulses detected by the magnetic sensor.

A user inputs a desired number of output rotations in the required rotational amount input part, which converts the inputted number of output rotations to a corresponding required number of rotation pulses. Here, the number of output rotations refers to the number of rotations reduced by the gearbox 360, 460. A conversion formula will be later described in detail with reference to FIGS. 3 and 4.

The comparison part compares the number of rotation pulses from the rotation detector part with the number of rotation requirement pulses from the required rotational amount input part.

The current controller part controls the supply current supplied to the brushless DC motor according to comparison result of the comparison part, whereupon the brushless DC motor continues to rotate or stops.

A zero current is applied or a multi-phase current with an equal intensity is applied to each stator in the brushless DC motor in order to stop the brushless DC motor.

Control apparatuses for the sensorless type brushless DC motor and the sensor type brushless motor will be described with reference to FIG. 3 and FIG. 4, respectively.

FIG. 3 is a schematic diagram illustrating a control apparatus for a sensorless type brushless DC motor according to an embodiment of the present invention. As shown in FIG. 3, the control apparatus comprises a sensorless type brushless DC motor 100, a current controller part 320, a required rotational amount input part 330, a comparison part 340, a counter electromotive force detectorpart 350, and a gearbox 360.

The sensorless type brushless DC motor 100, as illustrated in FIG. 1, comprises a stator 120 and a rotor 130, and rotates the rotor 130 according to Fleming's Left Hand Rule using a multiphase current applied from the current controlling part 320. A rotation of the rotor 130 induces counter electromotive forces in multiphase coils wound around the stator 120. The sensorless brushless DC motor can be realized in various forms, for example with the stator 120 receiving a pairs of three-phase supply currents, and the rotor 130 having b pairs of the two poles, etc.

The explanations below will be based on the regular three-phase bipolar form shown in FIG. 1. However, it is to be appreciated that the scope of the invention is not limited to this case.

The counter electromotive force detector part 350 corresponds to the rotation detector part. The counter electromotive force detector part 350 detects the counter electromotive forces generated in the sensorless type brushless DC motor 100. The counter electromotive forces occur twice respectively in the three T-shaped teeth 125 of the stator of the sensorless type brushless DC motor 100. The tooth 125$u$ around which the U-phase coil 150$u$ is wound faces the N pole and S pole of the rotor 130 once each, during one rotation of the rotor 130, so that a counter electromotive force is generated twice in the U-phase coil 150$u$. This is also true for the V-phase coil 150$v$, and the W-phase coil 150$w$.

Therefore, during one rotation of the rotor 130, the counter electromotive forces occur six times in total in the U-phase coil 150$u$, V-phase coil 150$v$, and W-phase coil 150$w$.

The counter electromotive forces induced in the U-phase coil 150$u$, V-phase coil 150$v$, and W-phase coil 150$w$ are generated sequentially with a time interval as the N pole and S pole move.

The counter electromotive force detector part 350 increases a measured counter electromotive force pulse number with each occurrence of counter electromotive force, and calculates the number of occurrences of the counter electromotive forces measured up to the present as a measured counter electromotive force pulse number. Then, it is preferable that when the sensorless type brushless DC motor 100 stops, the measured counter electromotive force pulse number is reset to its initial value, so that when the sensorless type brushless DC motor 100 rotates again, it is increased to count a new measured counter electromotive force pulse number.

The required rotational amount input part 330 receives a required number of output rotations in the sensorless type brushless DC motor 100, comprising the gearbox 360 having a predetermined gear reduction ratio, as input from a user. Here, the gear reduction ratio is defined as a ratio of the number of rotations of the sensorless type brushless DC motor 100 to the number of output rotations. With the sensorless type brushless DC motor 100 illustrated in FIG. 1, six occurrences of counter electromotive force are sensed sequentially with equal time intervals. Thus, the required rotational amount input part 330 receives a required number of output rotations as input and converts it to a required counter electromotive force pulse number for comparing by the comparison part 340. The required counter electromotive force pulse number is equal to (the number of output rotations)×(the gear reduction ratio)×(the total number of counter electromotive forces currently sensed during one rotation of the sensorless type brushless DC motor), and can also be calculated by other formulas.

The above conversion may be performed by the comparison part 340 besides the required rotational amount input part 330.

The comparison part 340 receives the measured counter electromotive force pulse number as input from the counter electromotive force detector part 320, receives the required counter electromotive force pulse number as input from the required rotational amount input part 330, and compares the two values.

The current controller part 320 receives the comparison result from the comparison part 340 and applies to the sensorless type brushless DC motor 100 a supply current, which controls the rotation of the sensorless type brushless DC motor 100.

In case that the comparison result shows that the measured counter electromotive force pulse number is smaller than the required counter electromotive force pulse number, then the sensorless type brushless DC motor 100 has not yet rotated up to the requirement of the user, so that the current controller part 340 applies a supply current to the sensorless type brushless DC motor 100 that makes the sensorless type brushless DC motor 100 continue to rotate.

In case that the comparison result shows that the measured counter electromotive force pulse number is greater than or equal to the required counter electromotive force pulse number, then the sensorless type brushless DC motor 100 has rotated up to the requirement of the user, so that the current controller part 340 either applies a stop current that makes the sensorless type brushless DC motor 100 stop immediately or stops applying the supply current. Thus, the sensorless type brushless DC motor 100 stops rotating and immediately halts at its position.

The current controller part 320 may include a multi-phase inverter 310. The multi-phase inverter 310 changes a phase of each current such that a current with a different phase is applied to the U-phase, V-phase, and W-phase coils, respectively, when the current controller part 320 outputs the supply current or the stop current to the sensorless type brushless DC motor 100.

The current controller part 320 is the first to activate and rotate the sensorless type brushless DC motor 100 when there is an input from the user on the number of rotations.

This gearbox 360 controls a rotary angle of its output rotation in proportion to the number of rotations of the sensorless type brushless DC motor 100 according to a predetermined gear reduction ratio. In the case that the gear reduction ratio of the gearbox is k:1 (where k is a natural number), the brushless DC motor 100 rotates once to generate a 1/k number of output rotation of the gearbox, whereby an accurate angle control can be performed. For example, when the k is 360, the brushless DC motor 100 rotates to generate an output rotation by 1°, and when the k is 720, the sensor type brushless DC motor 100 performs one rotation to generate an output rotation by 0.5°.

The control apparatus of the present invention is thus allowed to control the sensorless type brushless DC motor 100 to rotate as many times as the number of rotations calculated by the conversion formula in order to generate an output of rotation with a desired rotary angle.

In the case that the gear reduction ratio of the gearbox 360 is k:1, namely k, the sensorless type brushless DC motor 100 rotates k times during one rotation of the rotational output of the gearbox 360. Accordingly, in the case that the user wishes an x number of rotations (where x is a real number greater than zero) as the rotational output, the sensorless type brushless DC motor 100 is controlled to rotate x×k times.

It is to be appreciated that each component of the invention may be combined or separated to perform the functions as set forth above, without departing from the spirit of the invention.

FIG. 4 is a schematic diagram illustrating a control apparatus for a sensor type brushless DC motor according to another embodiment of the present invention. As shown in FIG. 4, the control apparatus comprises a sensor type brushless DC motor 200, a current controller part 420, a required rotational amount input part 430, a comparison part 440, an F/G pulse detector part 450, and a gearbox 460.

As illustrated in FIG. 2, the sensor type brushless DC motor 200 comprises a stator 120 and a rotor 130 and uses a multi-phase current applied from the current controller part 420 to rotate the rotor 130 according to Fleming's Left Hand Rule. The magnetic sensor 210 generates a F/G pulse according to the rotation of the rotor 130. The sensor type brushless DC motor can be realized in various forms, for example with the stator 120 receiving a pairs of three-phase apply currents, and the rotor 130 having b pairs of two poles, etc.

The explanations below will be based on the regular three-phase bipolar form shown in FIG. 2. However, it is to be appreciated that the scope of the invention is not limited to this case.

The F/G pulse detector part 450 corresponds to the rotation detector part. The F/G pulse detector part 450 detects the F/G pulses generated from the sensor type brushless DC motor 200. One F/G pulse is generated whenever the magnetic sensor 210 faces the N pole or the S pole due to the rotation of the rotor 130. Therefore, in the present example, one F/G pulse is generated with one rotation of the rotor 130.

The F/G pulse detector part 450 increases a measured F/G pulse number with each detection of the F/G pulse and calculates the number of F/G pulses measured up to the present as the measured F/G pulse number. Then, it is preferable that when the sensor type brushless DC motor 200 stops, the measured F/G pulse number is reset to its initial value, so that when the sensor type brushless DC motor 200 rotates again, it is increased to count a new measured F/G pulse number.

The required rotational amount input part 430 receives the number of output rotations required in the sensor type brushless DC motor 200 comprising the gearbox 460 as input from the user. One occurrence of F/G pulse is sensed with one rotation of the sensor type brushless DC motor 200 illustrated in FIG. 2. Thus, the required rotational amount input part 430 receives the required number of output rotations as input and converts it to a required F/G pulse number for comparing by the comparison part 440. The required F/G pulse number is equal to (the inputted number of output rotations)×(the gear reduction ratio)×(the total number of F/G pulses currently sensed during one rotation of the sensor type brushless DC motor). The required F/G pulse number can also be evaluated through other formulas.

The above conversion may be performed by the comparison part 440 besides the required rotational amount input part 430.

The comparison part 440 receives the measured F/G pulse number from the F/G pulse detector part 450 and the required F/G pulse number from the required rotational amount input part 430 to compare the two values.

The current controller part 420 receives a comparison result from the comparison part 440 and applies to the sensor type brushless DC motor 200 a current which controls the rotation of the sensor type brushless DC motor 200.

In case that the comparison result shows that the measured F/G pulse number is smaller than the required F/G pulse number, then the sensor type brushless DC motor 200 has not yet rotated up to the requirement of the user, so that the current controller part 420 applies a current to the sensor type brushless DC motor 200 that makes the sensor type brushless DC motor 200 continue to rotate.

In case that the comparison result shows that the measured F/G pulse number is greater than or equal to the required F/G pulse number, then the sensor type brushless DC motor 200 has rotated up the requirement of the user, so that the current controller part 420 either supplies a stop current that makes the sensor type brushless DC motor 200 stop immediately or stops applying a supply current. Thus, the sensor type brushless DC motor 200 stops rotating and immediately halts at its position.

The current controller part 420 may comprise a multiphase inverter 410. The multi-phase inverter 410 changes a phase of each current such that a current with a different phase is transferred to the U-phase, V-phase, and W-phase coils, respectively, when the current controller part 420 applies the supply current or the stop current to the sensor type brushless DC motor 200.

The current controller part 420 is the first to activate and rotate the sensor type brushless DC motor 200 when there is an input from the user on the number of rotations.

The gearbox 460 controls a rotary angle of its output rotation in proportion to the number of rotations of the sensor type brushless DC motor 200 according to its predetermined gear reduction ratio. In the case that the gear reduction ratio of the gearbox is k:1 (where k is a natural number), the sensor type brushless DC motor 200 rotates once to generate a 1/k number of output rotation, whereby an accurate angle control can be performed. For example, when the k is 360, the sensor type brushless DC motor 200 rotates to generate an output rotation by 1°, and when the k is 720, the sensor type brushless DC motor 200 performs one rotation to generate an output rotation by 0.5°.

A control apparatus according to another embodiment of the present invention controls the sensor type brushless DC motor 200 to rotate as many times as the number of rotations calculated by the conversion formula in order to generate an output rotation with a desired angle.

In the cast that the gear reduction ratio of the gearbox 460 is k:1, the sensor type brushless DC motor 200 performs a k number of rotations during one rotation of the output rotation of the gearbox 460. Accordingly, when the user wishes an x number of output rotations (where x is a real number greater than zero), the sensor type brushless DC motor 200 is controlled to rotate x×k times.

It is to be appreciated that each component of the invention may be combined or separated to perform the functions as set forth above, without departing from the spirit of the invention.

Figure 5:
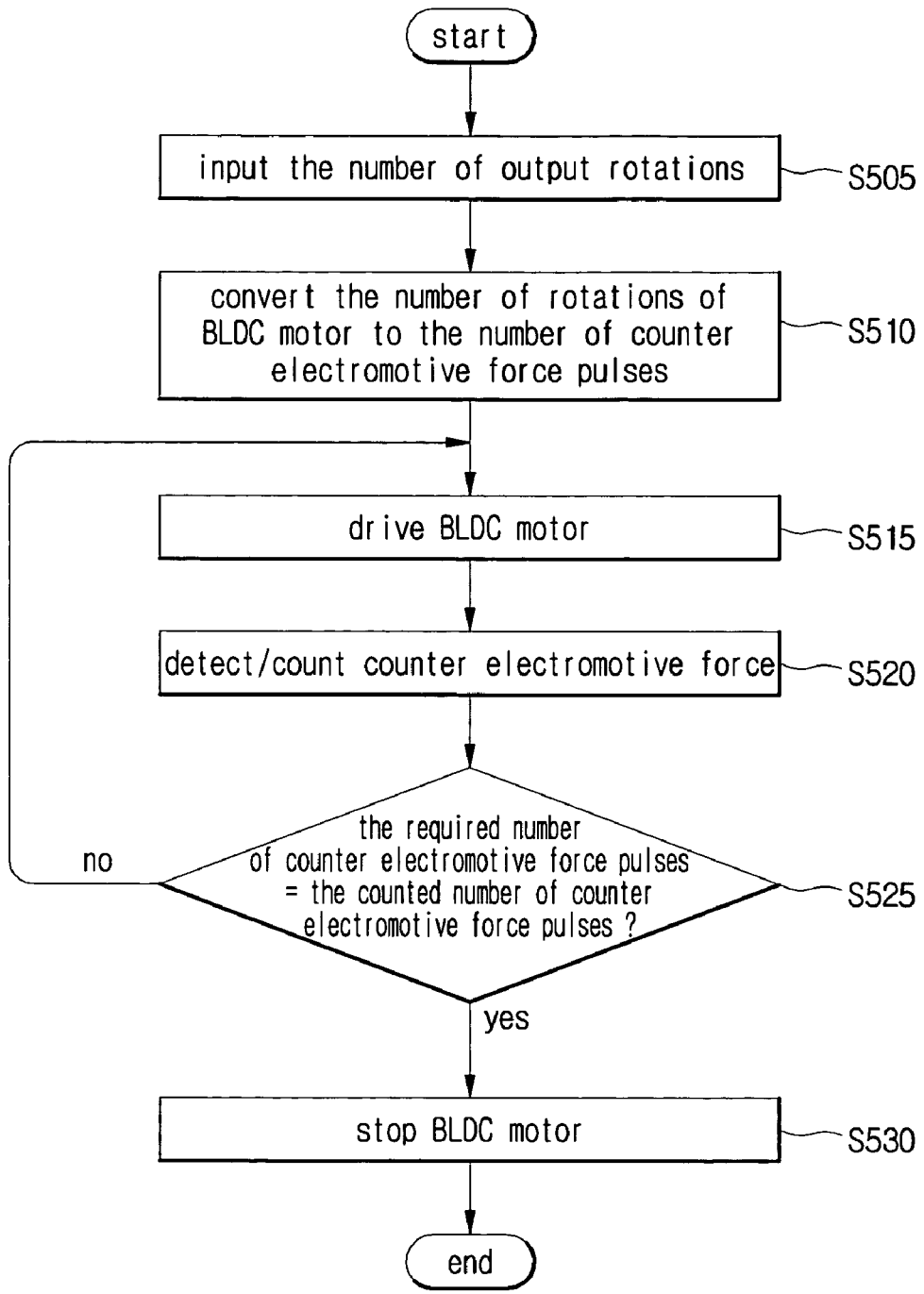
FIG. 5 is a flowchart illustrating a control method for the sensorless type brushless DC motor shown in FIG. 1 according to an embodiment of the present invention.

FIG. 5 is a flowchart illustrating a control method for the sensorless type brushless DC motor 100 shown in FIG. 1 according to an embodiment of the present invention.

As shown in FIG. 5, in step S505, a user inputs an ultimately desired amount of rotations, namely, the number of output rotations through the required rotational amount input part 330. Here, the amount of rotations refers to the number of output rotations of the sensorless type brushless DC motor 100 reduced through the gearbox 360. Here, it is preferable that the measured counter electromotive force pulse number of the counter electromotive force detector part 350 be set to a default value.

In step S510, the required rotational amount input part 330 converts the number of output rotations to the number of rotations required in the sensorless type brushless DC motor 100. The rotations of the sensorless type brushless DC motor 100 are reduced according to the gear reduction ratio of the gearbox 360 connected to the sensorless type brushless DC motor 100 to generate the aforementioned number of output rotations. Therefore, the number of rotations of the sensorless type brushless DC motor 100 is equal to (the required number of output rotations)×(the gear reduction ratio). Here, the gear reduction ratio represents a ratio of the number of rotations of the sensorless type brushless DC motor 100 before reduced by the gearbox 360 to the number of rotations of the sensorless type brushless DC motor 100 after reduced by the gearbox 360.

The required rotational amount input part 330 converts the converted rotation number to a required counter electromotive force pulse number by a formula established according to the characteristics of the sensorless type brushless DC motor 100. The required counter electromotive force pulse number may be equal to (the converted number of rotations)×(the total number of occurrences of counter electromotive force sensed during one rotation of the sensorless type brushless DC motor 100), and can also be evaluated by another formula. The above conversion may be performed by a comparison part 340 besides the required rotational amount input part 330.

In step S515, the current controller part 320 first activates and rotates the sensorless type brushless DC motor 100 when there is an input from the user on the amount of rotations.

In step S520, the counter electromotive force detector part 350 detects the counter electromotive forces generated due to the rotation of the sensorless type brushless DC motor 100, and calculates the measured counter electromotive force pulse number generated and measured up the present.

In step S525, the comparison part 340 compares the required counter electromotive force pulse number and the measured counter electromotive force pulse number.

In case that the comparison result shows the measured counter electromotive force pulse number is equal to the required counter electromotive force pulse number, then the sensorless type brushless DC motor 100 has rotated up to the requirement of the user, and the process proceeds to step S530. The current controller part 320 either applies a stop current that makes the sensorless type brushless DC motor 100 stop immediately or stops applying a supply current. Thus, the sensorless type brushless DC motor 100 stops rotating and immediately halts at its position.

However, in case that the comparison result shows the measured counter electromotive force pulse number is smaller than the required counter electromotive force pulse number, then the sensorless type brushless DC motor 100 has not yet rotated up to the requirement of the user, so that the process returns to step S515 wherein the current controller part 320 applies a current to the sensorless type brushless DC motor 100 that makes the sensorless type brushless DC motor 100 continue to rotate. Then, steps S515 to S525 are repeated.

Figure 6:
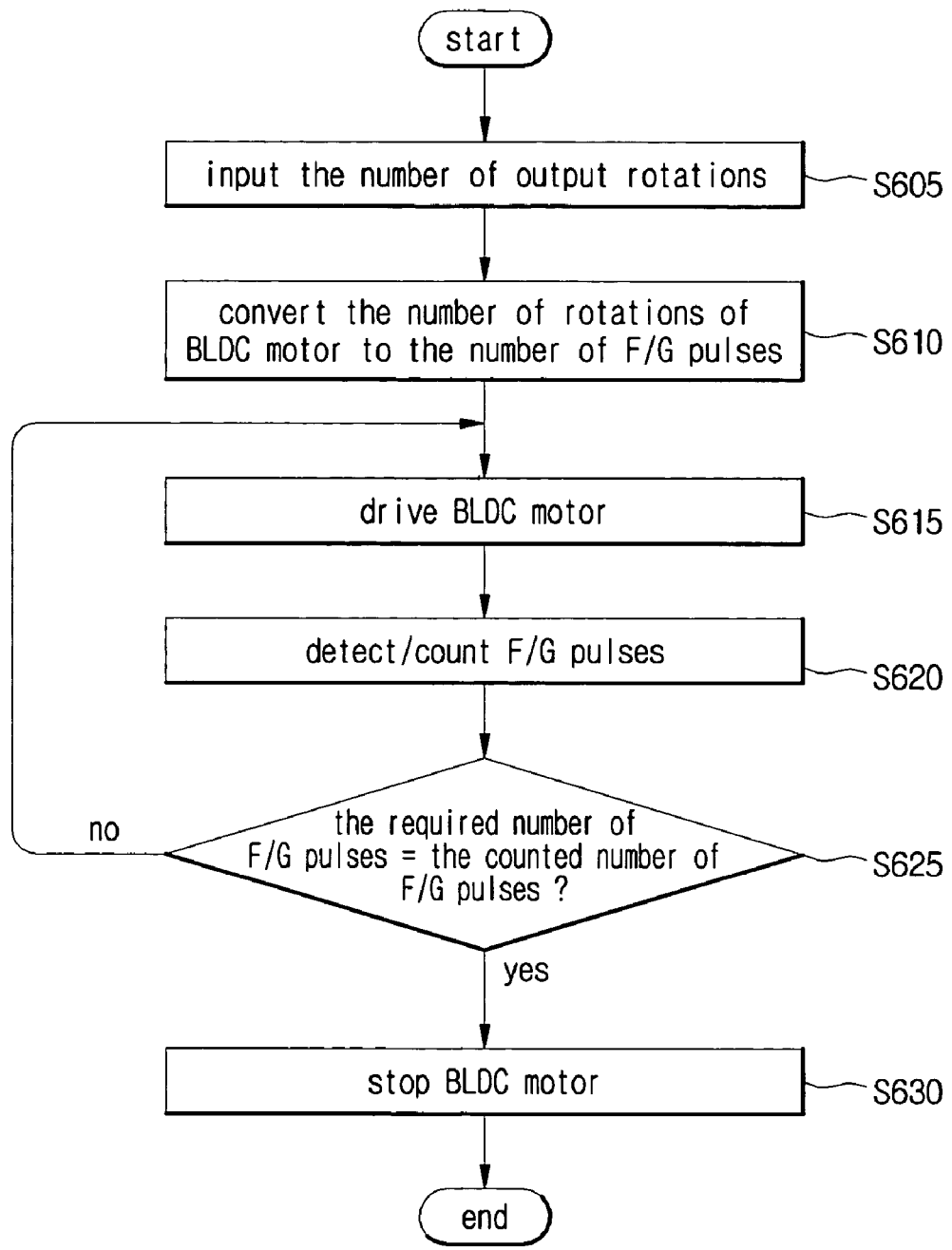
FIG. 6 is a flowchart illustrating a control method for the sensor type brushless DC motor shown in FIG. 2 according to another embodiment of the present invention.

FIG. 6 is a flowchart illustrating a control method for the sensor type brushless DC motor 200 shown in FIG. 2 according to another embodiment of the present invention.

As shown in FIG. 6, in step S605, a user inputs the ultimately desired amount of rotations, namely, the number of output rotations through the required rotational amount input part 430. Here, it is preferable that the measured F/G pulse number of the F/G detector part 450 be set to its default value.

In step S610, the required rotational amount input part 430 converts the number of output rotations to the number of rotations required in the senor type brushless DC motor 200. The rotations of the senor type brushless DC motor 200 are reduced according to the gear reduction ratio of the gearbox 460 connected to the sensor type brushless DC motor 200 to generate the aforementioned number of output rotations. Therefore, the number of rotations of the sensor type brushless DC motor 200 is equal to (the required output rotation number)×(the gear reduction ratio). Here, the gear reduction ratio represents a ratio of the number of rotations of the sensor type brushless DC motor 200 before reduced by the gearbox 460 to the number of rotations of the sensor type brushless DC motor 200 after reduced by the gearbox 460.

The required rotational amount input part 430 converts the converted rotation number to a required F/G pulse number by a formula established according to the characteristics of the sensor type brushless DC motor 200. The required F/G pulse number may be equal to (the converted number of rotations)×(the number of F/G pulses sensed during one rotation of the sensor type brushless DC motor 200), and can also be evaluated by another formula. The above conversion may be performed by a comparison part 440 besides the required rotational amount input part 430.

In step S615, the current controller part 420 first activates and rotates the sensor type brushless DC motor 200 when there is an input from the user on the number of rotations.

In step S620, the F/G pulse detector part 450 detects the F/G pulses generated due to the rotation of the sensor type brushless DC motor 200, and calculates a measured F/G pulse number generated and measured up the present.

In step S625, the comparison part 440 compares the required F/G pulse number and the measured F/G pulse number.

If the comparison result shows that the measured F/G pulse number is equal to the required F/G pulse number, then the sensor type brushless DC motor 200 has rotated up to the requirement of the user, and the process continues to step S630. The current controller part 420 either applies a stop current that makes the sensor type brushless DC motor 200 stop immediately or stops applying a supply current. Thus, the sensor type brushless DC motor 200 stops rotating and immediately halts at its position.

However, if the comparison result shows that the measured F/G pulse number is smaller than the required F/G pulse number, then the sensor type brushless DC motor 200 has not yet rotated up to the requirement of the user, so that the process returns to step S615 wherein the current controller part 420 applies a supply current to the sensor type brushless DC motor 200 that makes the sensor type brushless DC motor 200 continue to rotate. Then, steps S615 to S625 are repeated.

While the invention has been described with reference to the disclosed embodiments, it is to be appreciated that those skilled in the art can change or modify the embodiments without departing from the scope and spirit of the invention or its equivalents as stated below in the claims.

What is claimed is:

1. A control apparatus for a brushless DC motor, which has a rotor with n poles (where n is a natural number) that performs an operation of rotating or stopping due to a supply current with m phases (where m is a natural number) applied to a stator, controlling a number of output rotations of a gearbox, which is connected to the brushless DC motor and has a predetermined gear reduction ratio, the gear reduction ratio representing a ratio of a number of rotations of the brushless DC motor to the number of output rotations of the gearbox, the control apparatus comprising:

a rotation detector part, which obtains a detected number of rotation pulses generated by the rotation of the rotor from the brushless DC motor;

a required rotational amount input part, which receives a number of output rotations as input and converts it to a corresponding required number of rotation pulses;

a comparison part, which compares the detected number of rotation pulses and the required number of rotation pulses; and a current controller part, which controls the supply current applied to the brushless DC motor according to a comparison result of the comparison part, the supply current being one of a first supply current and a second supply current, the current controller part applying the first supply current to the brushless DC motor when the detected number of rotation pulses is smaller than the required number of rotation pulses and applying the second supply current to the brushless DC motor when the detected number of rotation pulses is equal to the required number of rotation pulses, the brushless DC motor rotating at constant speed when the first supply current is applied and stopping when the second supply current is applied, wherein the brushless DC motor is a sensorless type, and the rotation detector part counts a total number of detections of counter electromotive force generated in a multiphase coil of the stator as the number of rotation pulses.

2. The control apparatus for a brushless DC motor of claim 1, wherein the required number of rotation pulses is equal to (the number of output rotations)×(the gear reduction ratio)×(the total number of occurrences of counter electromotive force per one rotation of the brushless DC motor).

3. A control method for a brushless DC motor, which has a rotor with n poles (where n is a natural number) that performs an operation of rotating or stopping due to a supply current with m phases (where m is a natural number) applied to a slot of a stator, controlling a number of output rotations of a gearbox, which is connected to the brushless DC motor and has a predetermined gear reduction ratio, the gear reduction ratio representing a ratio of a number of rotations of the brushless DC motor to the number of output rotations of the gearbox, the control method comprising:

receiving as input a number of output rotations;

converting the number of output rotations to a corresponding required number of rotation pulses;

applying a first supply current to activate the brushless DC motor;

counting a generated number of rotation pulses generated by the rotation of the brushless DC motor;

comparing the required number of rotation pulses and the generated number of rotation pulses;

repeating the counting of the generated number of rotation pulses and the comparing the required number of rotation pulses and the generated number of rotation pulses until the generated number of rotation pulses is equal to the required number of rotation pulses;

applying a second supply current to the brushless DC motor when the generated number of rotation pulses is equal to the required number of rotation pulses; and rotating the brushless DC motor at a constant speed when the first supply current is applied and stopping the brushless DC motor when the second supply current is applied, wherein the brushless DC motor is a sensorless type, and the counting the generated number of rotation pulses includes counting a total number of detections of counter electromotive force generated in a multiphase coil of the stator as the number of rotation pulses.

4. The control method for a brushless DC motor of claim 3, wherein the required number of rotation pulses is equal to (the number of output rotations)×(the gear reduction ratio)×(a total number of occurrences of counter electromotive force per one rotation of the brushless DC motor).

5. A brushless DC motor module, comprising:

a brushless DC motor having a rotor with n (where n is a natural number) poles which performs an operation of rotating or stopping due to an m (where m is a natural number) phase supply current applied to a stator, the supply current being one of a first supply current and a second supply current;

a gearbox connected to the brushless DC motor and having a predetermined gear reduction ratio, the gear reduction ratio representing a ratio of a number of rotations of the brushless DC motor to a number of output rotations of the gearbox;

a rotation detector part counting a detected number of rotation pulses generated by the rotation of the rotor of the brushless DC motor;

a required rotational amount input part receiving as input a number of output rotations and converting it to a corresponding required number of rotation pulses;

a comparison part comparing the detected number of rotation pulses and the required number of rotation pulses; and a current controller part controlling the supply current applied to the brushless DC motor according to a comparison result of the comparison part, the current controller part applying the first supply current to the brushless DC motor when the detected number of rotation pulses is smaller than the required number of rotation pulses and applying the second supply current to the brushless DC motor when the detected number of rotation pulses is equal to the required number of rotation pulses, the brushless DC motor rotating at a constant speed when the first supply current is applied and stopping when the second supply current is applied, wherein the brushless DC motor is a sensorless type and the rotation detector part counts a total number of occurrences of counter electromotive force in a multiphase coil of the stator as the number of rotation pulses.

6. The brushless DC motor module of claim 5, wherein the required number of rotation pulses is equal to (the number of output rotations)×(the gear reduction ratio)×(the total number of occurrences of counter electromotive force per one rotation of the brushless DC motor).

* * * * *